United States Patent [19]

Schmitt et al.

[11] Patent Number: 4,838,832
[45] Date of Patent: Jun. 13, 1989

[54] TOOTH SYSTEM FOR A SHAFT-HUB CONNECTION

[76] Inventors: Manfred Schmitt, Blockäcker 17/1; Wolfgang Hanke, Berliner Platz, both of 7920 Heidenheim, Fed. Rep. of Germany

[21] Appl. No.: 112,066

[22] Filed: Oct. 22, 1987

[30] Foreign Application Priority Data

Oct. 22, 1986 [DE] Fed. Rep. of Germany ....... 3635916

[51] Int. Cl.$^4$ .......................... F16D 1/06; F16D 1/10
[52] U.S. Cl. .................................... 464/162; 403/359
[58] Field of Search ............... 403/359; 464/158, 159, 464/160, 162

[56] References Cited

U.S. PATENT DOCUMENTS

| | | | |
|---|---|---|---|
| 2,015,430 | 9/1935 | Matthews et al. | 403/359 X |
| 2,969,250 | 1/1961 | Kull | 403/359 X |
| 3,331,217 | 7/1967 | Wildhaber | 464/158 |

FOREIGN PATENT DOCUMENTS 2636382 10/1980 Fed. Rep. of Germany .
1560270 2/1969 France .

OTHER PUBLICATIONS

German Standard DINs 5461 to 5465 and 5480.

*Primary Examiner*—Daniel P. Stodola
*Attorney, Agent, or Firm*—Grimes & Battersby

[57] ABSTRACT

There is provided a tooth system for the static transmission of a torque between two machine components coaxially disposed in one another, e.g. a shaft and a hub, in which the tooth surfaces are straight and are designed with a very large pressure angle and with large tip and root fillet radii. The pressure angle of one component deviating slightly from that of the other component by half the torsion angle so as to overcome backlash. As a result, under load, the tooth surfaces abut over their entire surface. Also, the hubs can be produced with a smaller blanking indentation, in particular in the case of discs made of sheet metal, which increases the bearing capacity, and furthermore this can be done even more precisely, which results in an increase in centering precision and less noise generation during operation.

8 Claims, 2 Drawing Sheets

TOOTH SYSTEM FOR A SHAFT-HUB CONNECTION

BACKGROUND OF THE INVENTION

1. Field of the Invention

The invention relates to a tooth system for transmitting a torque between two components disposed coaxially with one another, eg a shaft part and a hub part. The teeth have straight tooth surfaces, and root and tip fillet radii. Tooth systems of this type have been known for a long time and are the subject of German Standard DIN 5461 to 5465 and 5480.

These tooth systems are generally produced by hob milling, slotting or broaching. This machining enables solid components, in particular, to be manufactured very precisely. Frequently such a tooth system is also chosen for constructions in which the shaft part is solid, but the part on the hub side consists of several thin sheets of metal, for example in disc clutches, in which the discs have to be axially displaceable on the shaft during operation. Clutches of this type are also frequently disposed in the drive line of motor vehicles having an internal combustion engine. Special requirements with regard to accuracy and absence of noise are expected of these clutches because of the typical torsional vibration behavior of the motor.

2. Description of the Prior Art

The tooth system known from German Standard DIN 5461 has straight tooth surfaces, both on the shaft and on the hub, with the tooth surfaces being parallel to one another. In tooth systems comprising two parts which are not suppose to rest fixed on one another, such as, for example, a flange on a gear shaft, but are meant to remain axially movable, play is necessary in the tooth system. However as a result, after the play has been overcome, the two surfaces, which are only parallel in ideal circumstances, are one on top of the other under the torsion angle determined by play. Furthermore, as the two parts are constantly provided with the same pressure angles, contact only occurs at the edges or over a larger area in the case of corresponding deformation or when there is wear, particularly if the tooth system is manufactured with internal or external centering.

From German Standard DIN 5480 is known a tooth system having an involute profile with a trapezoidal reference profile, which produces an involute tooth surface during production in the hob milling process on the shaft part. With the hub part, which in the case of the disc clutch consists of thin discs, the blanking tool has to have a profile which exactly fits the shaft tooth. Even with this tooth system, which can also be produced for external, internal or surface centering, it is the edges that are important with the transmission of the torque to the one-sided support, subject to the necessary play stipulated by manufacture, because both the shaft and also the hub profiles have this same contour as stipulated in the standard. At the same time it should be borne in mind that these tooth systems, in contrast to a tooth system of gear wheels, has more and smaller teeth and receive a completely different tooth shape, in particular the inner tooth system of the hub part. Each tooth has small fillet radii at the root and tip. This requires an expensive and sensitive blanking tool, and nevertheless, the hub parts are only produced with large tolerances and disadvantageous deformation in the area of the cutting edges (blanking tool). Greater precision for both parts necessitates expensive machining and maintenance work. Too great a play in the coupling is the cause of unpleasant rattling noise and premature wear.

From French Patent Specification No. 1 560 270 is known a tooth system for the transmission of a torque. The tooth surfaces however do not have a flat surface, but consist of curves, with the root circle directly passing over into the tip circle. Between the hub and shaft parts only line contact can occur.

From German Auslegeschrift No. 26 36 382 is known a tooth system, in which the teeth consist of two surface parts under one angle, with there being no transition radius either at the tip or at the root or at the bend between the surface parts. With this tooth system there should intentionally occur no surface contact, but there should be line contact between the hub part and the shaft part.

In the U.S. Patent No. 2,969,250 to Kull, which issued on Jan. 24, 1961 is disclosed a tooth system, which likewise only has curved tooth surfaces and therefore only permits line contact.

These last mentioned citations relate in particular to hexagon heads of screws and therefore do not satisfy the requirements for shaft-hub connections regarding centering precision, surface bearing strength and resistance to wear.

SUMMARY OF THE INVENTION

The object of the invention is to create a tooth system for two components coaxially lying on one another and displaceable relative to one another for the transmission of a torque, which avoids the above mentioned disadvantages, has great bearing strength and good centering precision, and can be produced economically with narrow tolerances.

In accordance with the present invention, there is a tooth system having a low and wide teeth each with straight surfaces, large fillet radii in the tip and root region and a large pressure angle. From these features the result is that the pitch of the tooth system is constantly, relatively larger, preferably greater than 3 times the total height of each tooth. The fillet radii at the tooth root and at the tooth tip are, respectively, one or two times the total height of tooth. In the known tooth systems, on the other hand, there is always only a relatively small fillet radius, which is chosen irrespective of the total height of tooth. Also, the surface angle in accordance with the invention lies between 50 and 70 degrees, preferably between 55 and 65 degrees, ie, approximately twice as great as in known tooth surfaces. Furthermore, an essential feature of the invention is that the pressure angle of the teeth on the hub side is slightly smaller than that of the teeth on the shaft side. The difference between the pressure angles is selected so that the teeth along the entire straight surfaces of both parts do not come into contact until the necessary backlash which is a condition of manufacturing is overcome after the action of the torque between the parts, ie when the torsion of both parts caused by play has occurred.

The tooth system produced within the parameters of the invention discussed above has the following advantages. It provides a surface-centered tooth system with particularly high bearing strength in which the peripheral force can be transmitted over the entire surface via large flat areas to the tooth surfaces. Thanks to the short tooth shape and the large fillet radii at the tooth root, the teeth are only subject to slight deformation, which results in very high fatigue strength and centering precision and also low-noise operation. Because of the large tooth pitch and fillet radii there is the facility of producing the tooth system by means of a shank-type cutter, in which the axis of rotation lies parallel to the tooth system axis. With this manufacturing method for which computerized machinery is well suited, it is no longer necessary to provide an outlet for a hob type milling cutter of the usual type or a blanking tool at the end of the tooth system, which results in a reduction of the number of components and simplification of the construction.

For the manufacture of the hub side, insofar as it concerns a packet of thin sheets, a blanking process is again chosen. The result is better manufacturing quality because there is less deformation at the edges on account of the short tooth shape and the large root fillet radius. Consequently the contact surface has greater bearing strength. Furthermore a simpler blanking tool with a longer useful life can be used.

DESCRIPTION OF THE DRAWINGS

Advantageous further refinements of the invention are given in the sub-claims. The invention is explained in more detail below with reference to the drawings which show an exemplified embodiment.

BRIEF DESCRIPTION OF THE PREFERRED EMBODIMENTS

Figure 1:
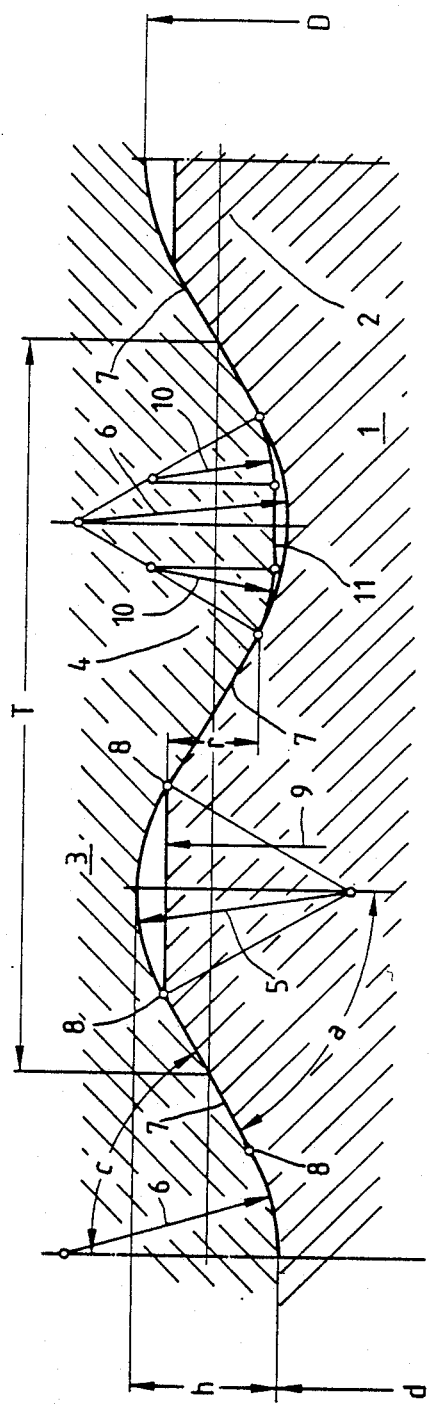
FIG. 1 shows the geometric design of the tooth system of the present invention.

In FIG. 1 is shown the geometric design of the tooth system according to the invention with a shaft 1 and a tooth 2 on the shaft side and also a hub 3 and a tooth 4 on the hub side in the embodiment with an unlimited number of teeth, i.e. in the rectilinear extended position (development) without backlash in the manner of a rack in the cross section perpendicular to the shaft axis. The greatest external diameter D is determined by the space in the hub 3 and the smallest internal diameter d which is determined by the shaft 1. The total height or the height of tooth h is then determined by half the difference between the external diameter D and the internal diameter d. The pitch of the tooth system is designated by T, and it is greater than three times the total height of tooth h, a preferred value being five times the total height of tooth h. The tooth tip is filleted with a single tip radius 5, the tooth root with a single root radius 6, with the root radius of the shaft theoretically corresponding to the tip radius of the hub and vice versa. Both tip and root radii 5,6 are connected by a straight tooth surface 7, which is connected tangentially to the two radii. Both fillet radii 5, 6 are one to two times, preferably one and a half times, the total height of tooth h. The tooth surface 7 of the tooth on the hub side and on the shaft side are, by using these parameters, under one pressure angle a, which lies between 45 and 70 degrees, preferably between 55 and 65 degrees. The lower boundary value for the root radius 6 is formed by the diameter of the milling cutter or tool with which the tooth system is produced. The upper boundary value is given by the geometric relation, i.e. the tooth surface, which forms the tangent between the tip and root fillet radius, becomes shorter as the radii 5,6 increase.

The radii 5,6 are chosen so that between the entry points 8 of the radii 5, 6 into the surface 7 there is produced a straight line and consequently on the entire tooth a plane, the radial extension r of which is approximately 0.6 times the total height of tooth h. This plane is flat and represents the actual contact surface over which the peripheral force can be transmitted over the entire surface from the shaft to the hub.

In order to guarantee that the tooth system is exclusively supported only on the surfaces 7 and to prevent the occurrence of contact between the tip areas, for example, of the shaft teeth 2 and the root area of the hub teeth 4, the tip and root radii 5,6 can be designed differently. Furthermore it is possible to make a tip reduction, e.g. at the shaft 1 on the diameter 9, with the reduction occurring so that the straight region of the surface 7 is retained at full extension. This reduction is preferably suited to teeth on the shaft side. Another form of tip reduction consists in adding to the entry point 8 of the tip radius 5 a small radius 10, to which a rectilinear part 11 is connected right up to the tooth center and symmetrically continues to the surface 7 on the rear side. This form of tip reduction is particularly suitable for the teeth 4 on the hub side, especially if the hub consists of a packet of thinly blanked sheets. The radius 10 is preferably designed as being equal to or greater than the sheet thickness of the individual sheets. In this way it is guaranteed that only a small blanking indentation, i.e. deformation, is formed at the blanked sheet edges, which in turn results in an increase in the amount of bearing surface. As, in contrast to the prior art, full surface contact occurs between the surfaces 7 of both components, in this way space is created for a lubricant and the deposit of particles of dirt.

Figure 2:
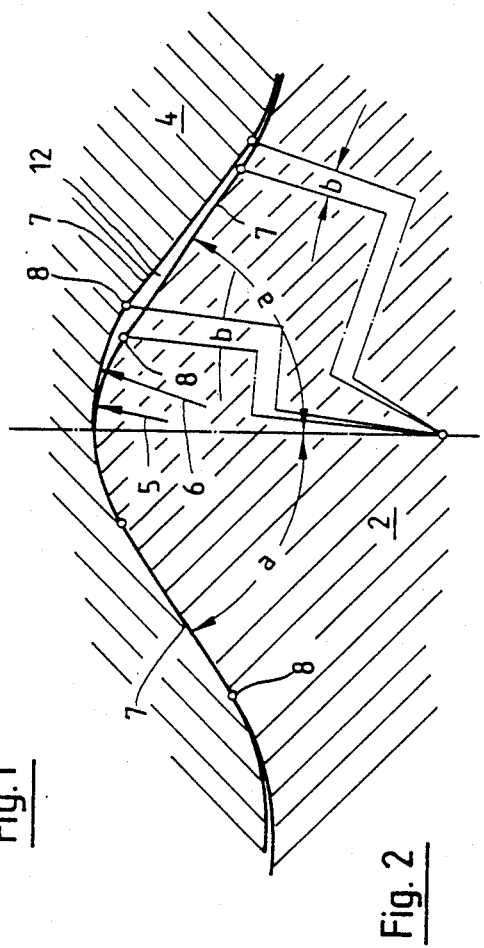
FIG. 2 shows the tooth system with backlash.

FIG. 2 shows a more detailed representation, similar to the practical design, of the surface region between the shaft 1 and the hub 3 curved in the assembly around a central axis. Shown is the situation in which on one side of the tooth 2 the surfaces 7 of the hub and shaft touch planarly, whereas on the other side the entire backlash 12 is visible. The tooth 2 of the shaft 1 has a tooth shape corresponding to the parameters described with regard to FIG. 1. Between the tooth 2 on the shaft side and the tooth 4 on the hub side there is a backlash 12, which is necessary for the operation of the tooth system and also a condition of manufacture. This is expressed by a relative torsional facility between the shaft and hub. However a deviation from the parallel position by both associated surfaces 7 of the teeth 2 and 4 on the shaft and hub side respectively corresponds to torsion angle b. If both parts are produced with geometrically identical teeth, an absolutely complete surface contact between the surfaces 7 is not possible, and the result is line contact together with its inherent disadvantages. According to the invention, the teeth 2 on the shaft side opposite the gap between the teeth 4 on the hub side are provided with a greater pressure angle a, which takes into consideration the relative torsion of the parts shaft 1 and hub 3 overcoming the backlash 12 under the effect of the torque. At the same time, the pressure angle a of the tooth 2 on the shaft side is composed of the pressure angle c between two teeth on the hub side and half the torsion angle, i.e. b/2. If the backlash 12, i.e. the entire torsion angle b, is overcome, the surfaces 7 of the touching teeth on the hub and shaft side are covered over their entire length. The choice of the size of backlash 12 (corresponding to angle b), which corresponds to twice the value of the difference between the pressure angle a and the pressure angle c, depends on the manufacturing quality of the hub tooth system or teeth 4 and the shaft tooth system or teeth 2 and a desired minimum play between both parts. By taking into consideration the backlash 12 when determining the pressure angle c at the teeth 4 on the hub side, the high level of centering precision and good bearing behavior also occur, which characterize this tooth system.

Figure 3:
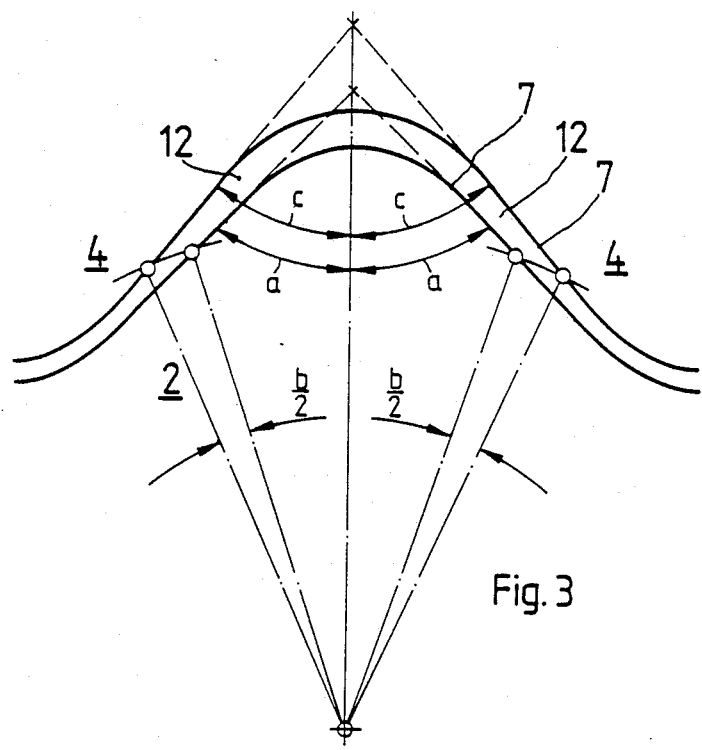
FIG. 3 shows the tooth system of FIG. 2 in a central position, after torsion around the angle b/2.

FIG. 3, furthermore, shows the tooth system in a central position, in which half the torsion angle b/2 is present between the surfaces 7. Furthermore, in the practical design are also given the different pressure angles a and c. The surfaces 7 of the teeth 2 and 4 on the shaft and hub side touch one another over their entire surfaces after torsion around the angle b/2. In contrast to this, FIG. 1 shows, as described, the tooth system without backlash in the extended position, with the pressure angle a being the same size as the pressure angle c.

Whereas the tooth systems defined in the DIN Standards proceed from a fixed reference profile with an invariable pressure angle, the present invention uses a tooth shape specially cut to size according to individual circumstances. The pressure angle a, c has no fixed value, but depends on the space available between the external and internal diameters D and d and also the radii and the number of teeth. Furthermore, the radius of curvature for the tooth tip and the tooth root are chosen so that between the tangentially effective peripheral force under the effect of a torque and the surface 7 there occurs an angle which is greater than the angle of friction. As a result wedging is avoided, e.g. of the tooth 2 on the shaft side in the associated space in the hub 3 and also automatic locking, which occurs at the same time, is avoided. Therefore, the hub 3 retains its unrestricted axial mobility on the shaft 1.

A preferred embodiment of the present invention is characterized in that the ratio of the total height of a tooth (h) to the largest external diameter (D) is between 1:20 and 1:50. Further, the tooth system is preferably characterized in that the pitch (T) is greater than three times the total height of a tooth (h).

We claim:

1. A tooth system for transmitting torque between two components disposed coaxially with one another, said two components being a shaft and a hub with each having a plurality of teeth, each tooth having a root, a tip and straight tooth surfaces with each straight tooth surface connecting one root to one adjacent tip, each root and each tip has a fillet radius and the fillet radius of each is one to two times the total height of the tooth wherein, each straight tooth surface is at a pressure angle which lies within the range of between 45 to 70 degrees, and wherein between the teeth of said shaft and the teeth of said hub there is formed a backlash and wherein the pressure angle of the teeth of said shaft is greater than the pressure angle of the teeth of said hub by an amount corresponding to half of a torsion angle needed to overcome the backlash between said shaft and said hub.

2. The tooth system according to claim 1, wherein the tooth surfaces of two adjacent teeth of one of said components are connected by a common fillet radius.

3. The tooth system according to claim 1, wherein said root and said tip of each tooth have a radius of curvature so that when the tooth system is under the effect of the torque no wedging occurs between said shaft and said hub and therefore locking therebetween is avoided.

4. The tooth system according to claim 1, wherein each pressure angle is between 55 to 65 degrees.

5. The tooth system according to claim 1, wherein the ratio of the total height of a tooth to the largest external diameter is between 1:20 and 1:50.

6. The tooth system according to claim 1, wherein the longitudinal distance between a point of one tooth of one of said components to the corresponding point on an adjacent tooth of the same one of said components defines a pitch and said pitch is greater than three times the height of a tooth.

7. The tooth system according to claim 6, wherein said c pitch is five times the height of a tooth.

8. The tooth system according to claim 1, wherein the fillet radius of each root and tip is one and a half times the height of the tooth.

* * * * *